United States Patent
Pleus

[11] 3,921,737
[45] Nov. 25, 1975

[54] WEIGHING APPARATUS

[75] Inventor: Edwin F. Pleus, Sun Prairie, Wis.

[73] Assignee: Aunt Nellie's Foods, Inc., Clyman, Wis.

[22] Filed: Feb. 27, 1974

[21] Appl. No.: 446,155

[52] U.S. Cl. .................................. 177/86; 177/115
[51] Int. Cl.² .................. G01G 13/22; G01G 13/24
[58] Field of Search ............................. 177/86–88, 177/90, 114, 115

[56] References Cited
UNITED STATES PATENTS

| | | | |
|---|---|---|---|
| 166,593 | 8/1875 | Colwell | 177/86 X |
| 975,158 | 11/1910 | Richardson | 177/87 |
| 981,391 | 1/1911 | Depew | 177/86 |
| 2,041,629 | 5/1936 | Wicks | 177/86 |
| 2,342,053 | 2/1944 | Kinnebrew | 177/86 |
| 2,618,456 | 11/1952 | Parrish | 177/86 |

*Primary Examiner*—George H. Miller, Jr.
*Attorney, Agent, or Firm*—Michael, Best & Friedrich

[57] ABSTRACT

Weighing apparatus, including a support frame, a balance beam support member pivotally mounted on the support frame and a drum member rotatably mounted on the balance beam support member. The balance beam support has a counterweight mounted on one end thereof which tends to cause it to pivot in one direction. The drum member has a plurality of equally angularly spaced weighing bins formed around the periphery thereof. Each of the bins is adapted to receive a quantity of material to be weighed when positioned in an upwardly opening material receiving position. The axis of rotation of the drum member is located on the opposite side of the pivot point of the balance beam support member from the counterweight so that the weight of the drum and the contents of one of the weighing bins will tend to pivot the balance beam support member in a direction opposite to that caused by the counterweight. A releasable stop means is provided to release the drum and allow it to rotate about its axis of rotation due to the weight of the material in one of the weighing bins when the balance beam support member is pivoted against the moment force applied to it by the counterweight. The stop means is further adapted to stop the rotation of the drum when the next adjacent weighing bin moves up to its material receiving position. Each rotational movement of the drum is of sufficient degree to cause the quantity of weighed material in the bin to be discharged therefrom by the force of gravity. The weighing apparatus also includes a braking mechanism for the drum to resist the rotation of the drum and therefore prevent damage to the parts.

16 Claims, 6 Drawing Figures

WEIGHING APPARATUS

BACKGROUND OF THE INVENTION

1. Field of the Invention

This invention relates to weighing apparatus and more particularly relates to weighing apparatus adapted to weigh a continuous flow of material such as potatoes.

2. Description of the Prior Art

All prior continuous flow type weighing apparatus known to applicant are of relatively complex construction and utilizes various electrical and/or electronic sensing elements. The principal object of the present invention is to provide a continuous flow type weighing apparatus which is of relatively simple construction and relatively inexpensive to manufacture as compared to prior devices. A further object is to provide such apparatus which is rugged and durable and which can be used in environments wherein sensitive electrical and/or electronic equipment would not be practical.

SUMMARY OF THE INVENTION

Weighing apparatus including a support frame and a balance beam support member pivotally mounted on the frame. The balance beam member has a counterweight mounted on one end thereof tending to cause the balance beam support to pivot in one direction. A drum member having a plurality of weighing bins formed therein is rotatably mounted on the balance beam support with the axis of rotation of the drum member located on the opposite side of the pivot point of the balance beam from the counterweight whereby the weight of the drum and the contents of one of the weighing bins will tend to pivot the balance beam support in the opposite direction from that caused by the counterweight. A releasable stop means for the drum is provided to release the drum and allow it to rotate about its axis of rotation when the balance beam support member is pivoted against the force of the counterweight when the weight of the material in the weighing bin becomes sufficient to overcome the weight of the counterweight.

DESCRIPTION OF THE PREFERRED EMBODIMENT

Figure 1:
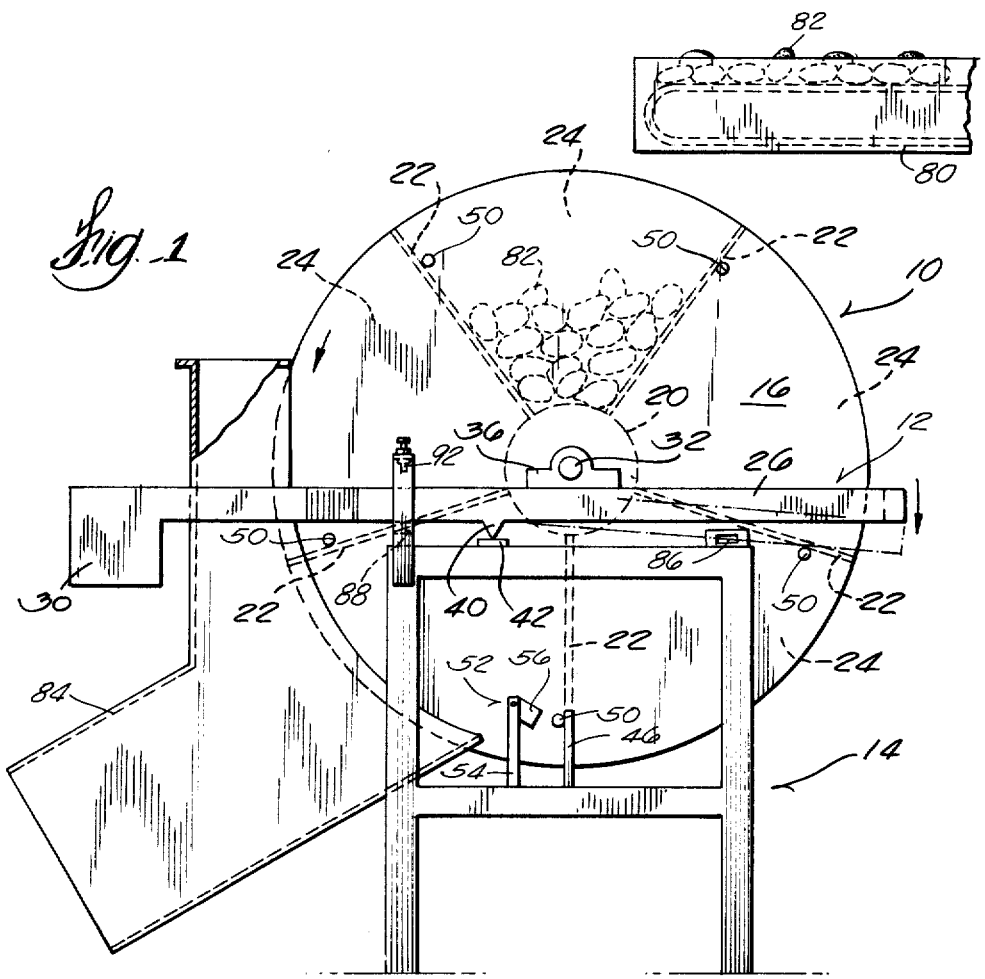
FIG. 1 is a side elevation view of a weighing apparatus made in accordance with the present invention.

The weighing apparatus of the present invention is comprised of a drum member 10 rotatably mounted on a balance beam support structure 12 which in turn is pivotally mounted on a stationary support frame 14.

Drum 10 is comprised of a pair of spaced side walls 16 and 18, a cylindrical core 20 and a plurality of equally angularly spaced radial wall members 22 which together provide a plurality of equally angularly spaced weighing bins 24. While the number of bins 24 can vary to some extent, in the preferred embodiment there are five bins which means that the angular spacing between bin walls 22 is 72°.

Figure 2:
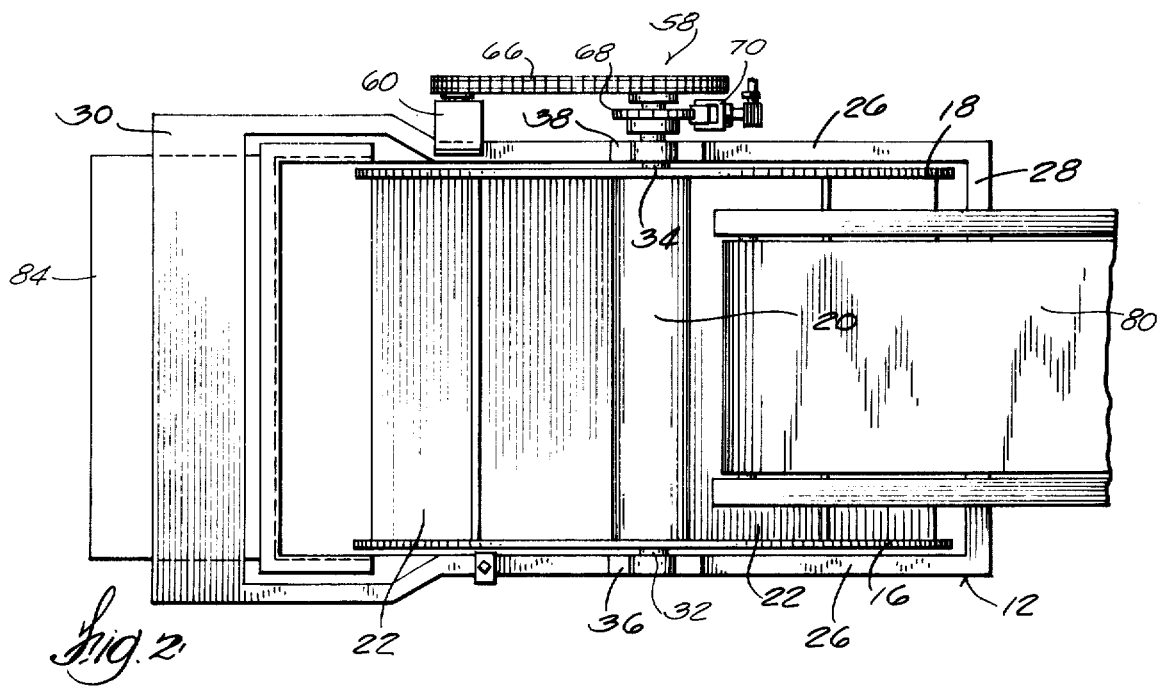
FIG. 2 is a top plan view of the weighing apparatus shown in FIG. 1.

Balance beam support structure 12 is comprised of a pair of side bar members 26, 26 positioned on opposite sides of drum 10, an end bar member 28 and a counterweight bar member 30 connecting the ends of side bar members 26, 26 as best shown in FIG. 2.

Drum 10 is freely rotatably mounted on balance beam support 12 by means of stub shafts 32 and 34 journaled in bearing blocks 36 and 38 respectively, mounted on the top surface of side bars 26, 26. Balance beam 12 is pivotally mounted on stationary frame 14 by means of knife edge members 40, 40 fastened to the underside of side arms 26, 26 which bear against bearing blocks 42, 42 mounted on frame 14 as best shown in FIG. 1.

Figure 4:
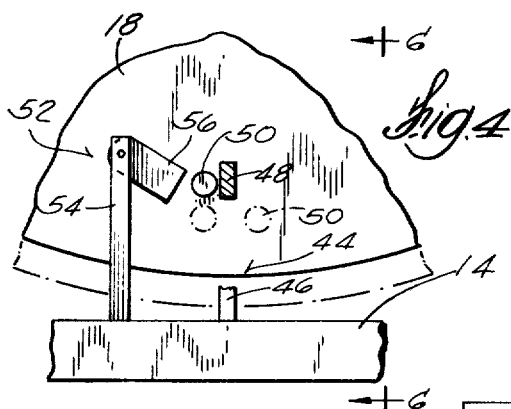
FIG. 4 is an enlarged fragmentary side elevation view of the lower portion of the weighing drum showing the releasable locking mechanism therefor.
Figure 6:
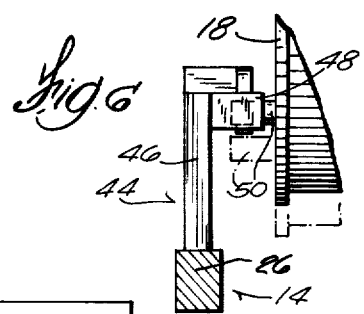
FIG. 6 is a view taken along line 6—6 of FIG. 4.

As best shown in FIGS. 4 and 6, a releasable stop mechanism 44 for drum 10 is provided. The mechanism 44 is comprised of a stationary vertical post 46 fastened to frame 14 and having a horizontally extending lip 48 at the top portion thereof. Lip 48 cooperates with a plurality of equally angularly spaced stop members 50 fastened to and extending from side wall 16 of drum 10. The number of stop members 50 required will depend on the number of bins 24 built into drum 10. In the preferred embodiment shown in the drawings there are five bins 24 and five stop members 50 (see FIG. 1).

Mechanism 52 for preventing rotation of drum 10 in the wrong direction is also provided. Mechanism 52 is comprised of a vertical post member 54 fastened to frame 14 and having a latch member 56 mounted for pivotal movement (in one direction) at the top portion thereof.

Figure 3:
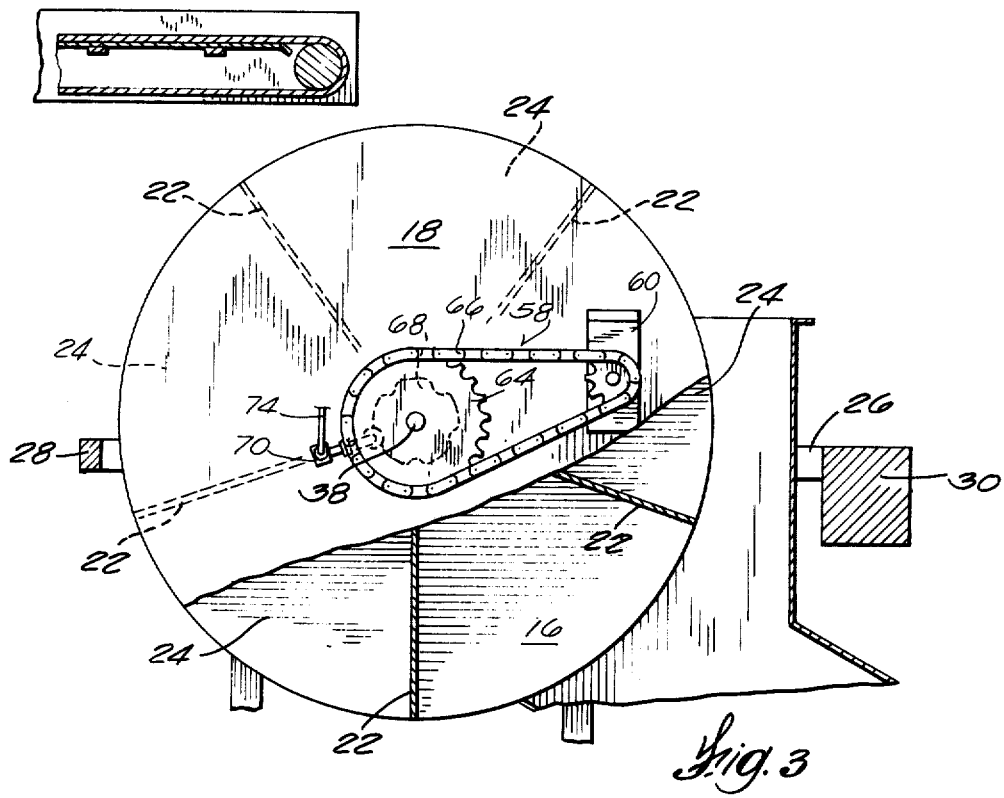
FIG. 3 is a fragmentary side elevation view (with parts broken away) showing the opposite side of the weighing apparatus shown in FIG. 1.
Figure 5:
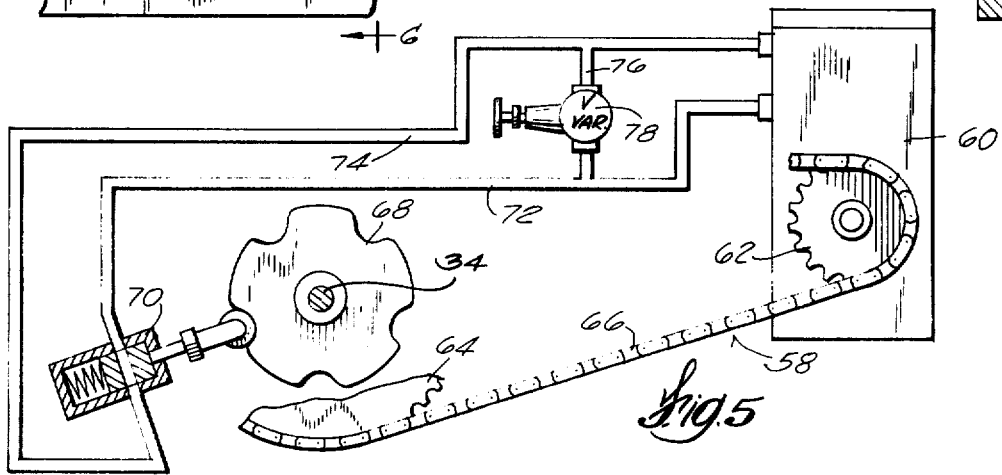
FIG. 5 is a partially schematic side elevation view of the braking mechanism for the weighing apparatus shown in FIGS. 1 and 2.

A brake mechanism 58 for the drum 10 is also provided. As best shown in FIGS. 2, 3 and 5, brake mechanism 58 is comprised of an hydraulic motor unit 60 having a drive sprocket 62. Drive sprocket 62 is operatively connected to a sprocket 64 by a chain drive member 66. Sprocket 64 is keyed to the end of stub shaft 34 so that it will rotate with drum 10. A cam member 68 for actuating a control valve 70 is also mounted on shaft 34 for rotation with drum 10. Motor unit 60 is provided with an hydraulic loop circuit comprising fluid lines 72 and 74 together with a bypass line 76 and a bypass variable restriction valve 78 mounted therein.

A conveyor mechanism 80 of any suitable design is provided to convey the material 82 to be weighed to the weighing apparatus and a chute 84 is provided to carry the weighed material from the unit after it has been weighed.

A counter-mechanism 86 of any suitable design is mounted on frame 14 adjacent one of the side bars 26 of balance beam support 12. The counter 86 therefore will be actuated by the side bar member 26 each time the balance beam support is pivoted during the operation of the mechanism which will now be described.

OPERATION

The material 82 to be weighed, such as potatoes, is conveyed in a continuous flow to the weighing mechanism by a conveyor 80. With the drum positioned as shown in FIG. 1, the side bars 26 of balance beam support 12 rest on stop surfaces 88 in which position one of stop members 50 on the side of the drum will be in engagement with the lip 48 of the stop mechanism 44. In this position there will be no rotation of the drum on its stub shafts 32, 34.

It will be noted at this point that in the weighing mechanism of this invention the counterweight bar 40 is positioned on one side of knife edge members 40, 40 whereas the axis of rotation of the drum (as represented by stub shafts 32, 34) is located on the other side of the knife edge members. Thus, it will be appreciated that when there is no material in the top receiving bin of the weighing mechanism located immediately beneath the end of the conveyor 80, the counterweight 30 will be of such magnitude as to cause the balance beam support 12 to assume its FIG. 1 position.

As the amount of material deposited in the top receiving bin 24 increases, the effect of counterweight 30 will eventually be overcome by the increased weight of material in the receiving bin. When the weight of the material in the receiving bin reaches a predetermined amount, the balance beam support will pivot about knife edge 40 in a clockwise direction as indicated by the arrow in FIG. 1. When this occurs, the stop member 50 on the side of the drum will drop down to the position indicated by the dotted line in FIGS. 4 and 6 below lip 48. In such position the stop member 50 will be out of engagement with lip 48 to thereby permit the drum to rotate in a counterclockwise direction (as shown by the arrow in FIG. 1) due to the weight of the material 82 in the receiving bin.

As the drum rotates, the center of gravity of the material 82 to be weighed is shifted to the left as shown in FIG. 1 which in turn will cause the balance beam support structure 12 to pivot back in a counterclockwise direction to its original position (FIG. 1) so that when the next stop member 50 on the side of the drum reaches stop mechanism 44, it will engage lip 48 to thereby stop the rotation of the drum. With five bins 24 the drum will rotate 72° to thereby bring the next bin up into its receiving position.

The weighed material 82 in the bin will be discharged by gravity from the bin into chute 84 and will be carried by the chute into a suitable receptacle not shown.

Each rotational movement of the drum is damped or braked by brake mechanism 58. As shown in FIG. 5, when the drum is in material receiving position like that shown in FIG. 1, cam member 68 will be positioned to allow valve 70 to assume its open position. However, as soon as rotation of the drum commences, the cam 68 will apply a closing movement to valve 70 which in turn will restrict flow of fluid from motor 60 through lines 72, 74 thus causing fluid to be recirculated only through variable restriction valve 78 in bypass line 76. The operation of valve 70 in combination with cam 68 allows the initial dumping rotation of drum 10 to occur without any braking effect from brake mechanism 58. Thus after value 70 is closed by cam 68 the further rotation of the drum will be resisted by the hydraulic resistance produced by the combination of variable restriction valve 78 and motor unit 60 which is operatively connected to the drum by chain drive member 62 which is connected between sprockets 62 and 64. Thus the braking or damping effect provided by mechanism 58 will produce a smooth and controlled rotation of the drum and thus prevent possible damage to the parts as each respective stop member 50 moves into engagement with the retaining lip 48 of the stop mechanism.

As best shown in FIG. 4, as each stop member 50 moves into engagement with lip 48, it will pass underneath the latch 56 of mechanism 52. Latch 56 is adapted to be pivoted in a counterclockwise direction only which thus allows free passage of pin 50 past the latch but prevents movement of pin 50 in the opposite direction should for any reason the drum be rotated in a clockwise direction.

Each pivotal movement of balance beam support 12 will cause an actuation of the counter mechanism 86. It will be appreciated, therefore, that since the weighing mechanism will be actuated only after a predetermined weight of material is deposited in the receiving bin, that by counting the number of actuations of such mechanism, a total weight of the material passing through the mechanism can be readily determined.

At the completion of one cycle of operation, i.e. with the drum rotated 72° to dump the material from the receiving bin, the cycle can then be repeated without any interruption in the continuous flow of material from conveyor 80. Furthermore, it will be appreciated that if the flow of material from conveyor 80 varies or comes to a complete stop, the weighing mechanism will accommodate itself to such condition without any effect on the accuracy of the weighing function which it is designed to perform.

I claim:
1. Weighing apparatus comprising:
   a support frame;
   a balance beam support member pivotally mounted on said support frame, said member having a counterweight mounted on one end thereof tending to cause said balance beam support member to pivot in one direction;
   a drum member having a plurality of weighing bins formed therein, each bin adapted to receive a quantity of material to be weighed, said drum member rotatably mounted on said balance beam support member with the axis of rotation of said drum member located on the opposite side of the pivot point of said balance beam support member from said counterweight whereby the weight of said drum and the contents of one of said weighing bins will tend to pivot said balance beam support member in the opposite direction, said drum member adapted when rotated in said one direction to discharge material from said weighing bins; and
   a releasable stop means for said drum adapted when said balance beam support member is pivoted in said opposite direction to release said drum and allow it to rotate about its axis of rotation in said one direction due to the weight of the material to be weighed in one of said weighing bins to thereby cause the material to be discharged from said one weighing bin by gravity.

2. Weighing apparatus according to claim 1 in which said releasable stop means is comprised of a stationary stop lip mounted on said support frame and a stop member mounted on said drum member, said stop lip and stop member adapted when said balance beam is pivoted in said one direction to engage each other and prevent rotation of said drum, said stop lip and stop member further adapted when said balance beam support member is pivoted in said opposite direction to disengage from each other to thereby allow said drum to rotate about its axis of rotation.

3. Weighing apparatus according to claim 1 in which said weighing apparatus further includes a braking mechanism for said drum member to resist the rotation of said drum when the drum is rotated due to the weight of material in one of said weighing bins.

4. Weighing apparatus according to claim 1 in which a counter mechanism is provided to count the number of times said drum is rotated subsequent to its release by said releasable stop means.

5. Weighing apparatus according to claim 1 in which said releasable stop means is further adapted to stop the drum from rotating after it has rotated a sufficient distance to cause the contents of the weighing bin to be discharged by gravity from said weighing bin.

6. Weighing apparatus according to claim 1 in which said weighing bins of said drum member are equally angularly spaced about the axis of rotation of said drum member and said stop means includes a plurality of stop members mounted on said drum member with the number of stop members corresponding to the number of weighing bins.

7. Weighing apparatus according to claim 6 in which there are five weighing bins in said drum member and five stop members mounted thereon.

8. Weighing apparatus comprising:
a support frame;
a balance beam support member pivotally mounted on said support frame, said member having a counterweight mounted on one end thereof tending to cause said balance beam support member to pivot in one direction;
a drum member having a plurality of equally angularly spaced weighing bins formed around the periphery thereof, each bin adapted to receive a quantity of material to be weighed when positioned in an upwardly opening material receiving position, said drum member rotatably mounted on said balance beam support member with the axis of rotation of said drum member located on the opposite side of the pivot point of said balance beam support member from said counterweight whereby the weight of said drum and the contents of one of said weighing bins will tend to pivot said balance beam support member in the opposite direction, said drum member adapted when rotated in said one direction to discharge material from said weighing bins; and
a releasable stop means for said drum adapted when said balance beam support member is pivoted in said opposite direction to release said drum and allow it to rotate about its axis of rotation in said one direction due to the weight of the material to be weighed in one of said weighing bins, said stop means further adapted to stop the rotation of said drum when the next adjacent weighing bin moves up to its material receiving position, said rotation of said drum being sufficient to cause the quantity of weighed material in the bin to be discharged therefrom by gravity.

9. Weighing apparatus according to claim 8 in which said weighing apparatus further includes a braking mechanism for said drum member to resist the rotation of said drum when the drum is rotated due to the weight of material in one of said weighing bins.

10. Weighing apparatus according to claim 8 in which a counter mechanism is provided to count the number of times said drum is rotated to cause the quantity of weighed material in the bin to be discharged therefrom.

11. Weighing apparatus according to claim 8 in which said releasable stop means is comprised of a stationary stop lip mounted on said support frame and a plurality of stop members mounted on said drum member, there being one stop member for each of said weighing bins, said stop lip and one of said stop members adapted when said balance beam is pivoted in said one direction to engage each other and prevent rotation of said drum, said stop lip and stop member further adapted when said balance beam support member is pivoted in said opposite direction to disengage from each other to thereby allow said drum to rotate about its axis of rotation.

12. Weighing apparatus according to claim 11 in which there are five weighing bins in said drum member and five stop members mounted thereon.

13. Weighing apparatus comprising:
a support frame;
a balance beam support member pivotally mounted on said support frame, said member having a counterweight mounted on one end thereof tending to cause said balance beam support member to pivot in one direction;
a drum member having a plurality of weighing bins formed therein, each bin adapted to receive a quantity of material to be weighed, said drum member rotatably mounted on said balance beam support member with the axis of rotation of said drum member located on the opposite side of the pivot point of said balance beam support member from said counterweight whereby the weight of said drum and the contents of one of said weighing bins will tend to pivot said balance beam support member in the opposite direction, said drum member adapted when rotated in said one direction to discharge material from said weighing bins;
a releasable stop means for said drum adapted when said balance beam support member is pivoted in said opposite direction to release said drum and allow it to rotate about its axis of rotation in said one direction due to the weight of the material to be weighed in one of said weighing bins to thereby cause the material to be discharged from said one weighing bin by gravity; and
a braking mechanism for said drum member to resist the rotation of said drum when the drum is rotated due to the weight of material in one of said weighing bins, said braking mechanism including an hydraulic motor unit drivingly connected to said drum and an hydraulic loop circuit connected to said motor unit, said hydraulic loop circuit having a restriction means therein to restrict the output of said motor unit and thereby apply a braking action to said drum member.

14. Weighing apparatus according to claim 13 in which said braking mechanism further includes a second hydraulic loop circuit which bypasses said restriction means and a control valve in said second hydraulic loop circuit, said control valve being operatively connected to said drum member so that when said drum is rotated in said one direction said control valve will be closed after a given amount of unrestricted rotation of the drum occurs.

15. Weighing apparatus comprising:
a support frame;
a balance beam support member pivotally mounted on said support frame, said member having a counterweight mounted on one end thereof tending to cause said balance beam support member to pivot in one direction;

a drum member having a plurality of equally angularly spaced weighing bins formed around the periphery thereof, each bin adapted to receive a quantity of material to be weighed when positioned in an upwardly opening material receiving position, said drum member rotatably mounted on said balance beam support member with the axis of rotation of said drum member located on the opposite side of the pivot point of said balance beam support member from said counterweight whereby the weight of said drum and the contents of one of said weighing bins will tend to pivot said balance beam support member in the opposite direction, said drum member adapted when rotated in said one direction to discharge material from said weighing bins;

a releasable stop means for said drum adapted when said balance beam support member is pivoted in said opposite direction to release said drum and allow it to rotate about its axis of rotation in said one direction due to the weight of the material to be weighed in one of said weighing bins, said stop means further adapted to stop the rotation of said drum when the next adjacent weighing bin moves up to its material receiving position, said rotation of said drum being sufficient to cause the quantity of weighed material in the bin to be discharged therefrom by gravity; and a braking mechanism for said drum member to resist the rotation of said drum when the drum is rotated due to the weight of material in one of said weighing bins, said braking mechanism including an hydraulic motor unit drivingly connected to said drum and an hydraulic loop circuit connected to said motor unit, said hydraulic loop circuit having a restriction means therein to restrict the output of said motor unit and thereby apply a braking action to said drum member.

16. Weighing apparatus according to claim 15 in which said braking mechanism further includes a second hydraulic loop circuit which bypasses said restriction means and a control valve in said second hydraulic loop circuit, said control valve being operatively connected to said drum member so that when said drum is rotated in said one direction said control valve will be closed after a given amount of unrestricted rotation of the drum occurs.

* * * * *